(12) United States Patent
Keane (10) Patent No.: US 7,398,470 B2
(45) Date of Patent: Jul. 8, 2008

(54) SYSTEM AND METHOD FOR REMOTE ASSISTANCE

(75) Inventor: Robert Keane, Arlington, MA (US)

(73) Assignee: Vistaprint Technologies Limited, Hamilton (BM)

( * ) Notice: Subject to any disclaimer, the term of this patent is extended or adjusted under 35 U.S.C. 154(b) by 663 days.

(21) Appl. No.: 10/646,133

(22) Filed: Aug. 22, 2003

(65) Prior Publication Data

US 2005/0044232 A1 Feb. 24, 2005

(51) Int. Cl.
*G06F 3/00* (2006.01)
*G06F 3/01* (2006.01)

(52) U.S. Cl. .................. 715/733; 715/751; 715/753; 705/26; 709/204

(58) Field of Classification Search ............. 704/275, 704/270, 271; 709/217, 227, 204; 715/705; 705/26

See application file for complete search history.

(56) References Cited

U.S. PATENT DOCUMENTS

| | | | |
|---|---|---|---|
| 5,452,221 A | | 9/1995 | Tumeidi |
| 5,513,117 A * | | 4/1996 | Small .................. 700/233 |
| 5,534,975 A * | | 7/1996 | Stefik et al. .................. 399/1 |
| 5,563,805 A * | | 10/1996 | Arbuckle et al. ............ 709/204 |
| 5,805,846 A * | | 9/1998 | Nakajima et al. ........... 715/753 |
| 5,903,905 A * | | 5/1999 | Andersen et al. ............ 715/526 |
| 5,933,479 A * | | 8/1999 | Michael et al. ........ 379/110.01 |
| 5,983,369 A * | | 11/1999 | Bakoglu et al. .............. 714/46 |
| 5,995,985 A * | | 11/1999 | Cai ............................ 715/507 |
| 6,144,991 A * | | 11/2000 | England ........................... 709/205 |
| 6,230,287 B1 * | | 5/2001 | Pinard et al. ................ 714/31 |
| 6,295,551 B1 * | | 9/2001 | Roberts et al. ............. 709/205 |
| 6,404,747 B1 * | | 6/2002 | Berry et al. ................ 370/270 |
| 6,411,314 B1 * | | 6/2002 | Hansen et al. ............. 715/769 |
| 6,453,127 B2 * | | 9/2002 | Wood et al. .................... 399/8 |
| 6,529,214 B1 * | | 3/2003 | Chase et al. ................ 715/744 |
| 6,560,707 B2 * | | 5/2003 | Curtis et al. ................ 713/163 |

(Continued)

FOREIGN PATENT DOCUMENTS

EP 1205839 5/2002

(Continued)

OTHER PUBLICATIONS

Netviewer GMBH, "Ad hoc Desktop Sharing" (in German), http://web.archive.org/web/20030703002340/www.netviewer.de/download/netviewer_flyer_dt.pdf.

(Continued)

*Primary Examiner*—Weilun Lo
*Assistant Examiner*—Steven B Theriault
(74) *Attorney, Agent, or Firm*—Robert L. Dulaney; Jessica J. Costa (57) ABSTRACT

A number of geographically dispersed automated product design systems and support systems are connected to a network. A user of a design system requesting assistance in using the design system is connected to an operator of one of the support systems. A display and control connection is established between the user system and the support system such that the operator of the support system can monitor and control the user system. A discussion connection is established between the user of the user system and the operator of the support system such that the user can submit inquiries to and receive responses from the operator while the operator is viewing the information being displayed to the user at the user system.

27 Claims, 5 Drawing Sheets

U.S. PATENT DOCUMENTS

| | | | | |
|---|---|---|---|---|
| 6,573,911 | B2 * | 6/2003 | Brockbank | 715/753 |
| 6,589,292 | B1 * | 7/2003 | Langford-Wilson | 715/517 |
| 6,629,129 | B1 * | 9/2003 | Bookspan et al. | 709/204 |
| 6,665,587 | B2 * | 12/2003 | Leone et al. | 700/235 |
| 6,754,693 | B1 * | 6/2004 | Roberts et al. | 709/205 |
| 6,871,322 | B2 * | 3/2005 | Gusler et al. | 715/708 |
| 6,931,591 | B1 * | 8/2005 | Brown et al. | 715/517 |
| 6,950,852 | B1 * | 9/2005 | Kobayaghi et al. | 709/204 |
| 6,973,482 | B2 * | 12/2005 | Mohammed et al. | 709/208 |
| 6,973,617 | B1 * | 12/2005 | Parasu | 715/513 |
| 6,995,860 | B2 * | 2/2006 | Roztocil et al. | 358/1.18 |
| 7,003,723 | B1 * | 2/2006 | Kremer et al. | 715/517 |
| 7,062,465 | B1 * | 6/2006 | Shafiee et al. | 705/50 |
| 7,076,450 | B1 * | 7/2006 | Lopez, Jr. | 705/26 |
| 7,092,509 | B1 * | 8/2006 | Mears et al. | 379/266.01 |
| 7,139,795 | B2 * | 11/2006 | Davis | 709/204 |
| 7,149,936 | B2 * | 12/2006 | Deshpande et al. | 714/57 |
| 7,194,509 | B2 * | 3/2007 | Kawase et al. | 709/203 |
| 7,216,092 | B1 * | 5/2007 | Weber et al. | 705/26 |
| 7,236,258 | B2 * | 6/2007 | Wen et al. | 358/1.12 |
| 7,283,278 | B2 * | 10/2007 | Benstein | 358/1.18 |
| 7,287,054 | B2 * | 10/2007 | Lee et al. | 709/204 |
| 2002/0021902 | A1 * | 2/2002 | Hosoda et al. | 396/429 |
| 2002/0090240 | A1 * | 7/2002 | Lively | 400/76 |
| 2002/0116294 | A1 * | 8/2002 | Ranck et al. | 705/27 |
| 2002/0174010 | A1 * | 11/2002 | Rice, III | 705/14 |
| 2003/0043180 | A1 * | 3/2003 | Gusler et al. | 345/708 |
| 2003/0158957 | A1 * | 8/2003 | Abdolsalehi | 709/231 |
| 2003/0187672 | A1 * | 10/2003 | Gibson et al. | 705/1 |
| 2004/0039647 | A1 * | 2/2004 | Roche | 705/26 |
| 2004/0049547 | A1 * | 3/2004 | Matthews et al. | 709/206 |
| 2004/0064510 | A1 * | 4/2004 | Ooi et al. | 709/205 |
| 2004/0073684 | A1 * | 4/2004 | Jodra et al. | 709/228 |
| 2004/0139156 | A1 * | 7/2004 | Matthews et al. | 709/204 |
| 2004/0196491 | A1 * | 10/2004 | Uchino | 358/1.15 |
| 2004/0243454 | A1 * | 12/2004 | Yoshida | 705/7 |
| 2004/0243930 | A1 * | 12/2004 | Schowtka et al. | 715/513 |
| 2006/0181736 | A1 * | 8/2006 | Quek et al. | 358/1.18 |
| 2007/0022180 | A1 * | 1/2007 | Cocotis et al. | 709/217 |

FOREIGN PATENT DOCUMENTS

WO     WO 92/17581     10/1992

OTHER PUBLICATIONS

Netviewer Corp., "Ad hoc Desktop Sharing" (in English), http://www.netviewer.net/pdfs/flyer_netviewer_one2one_US.pdf.

Microsoft Corporation, "Windows Messenger for Windows XP", http://web.archive.org/web/20030606220012/messenger.msn.com/support/features.asp?client=0.

* cited by examiner

SYSTEM AND METHOD FOR REMOTE ASSISTANCE

FIELD OF THE INVENTION

This invention relates generally to systems and methods for providing remote support and assistance to customers engaged in designing or ordering goods or services.

BACKGROUND

Personal computer systems are in widespread use in workplace, home, and mobile environments and a large number of software programs are available to allow users to perform numerous different tasks on their computer systems. As one example, desktop publishing programs allowing a user to design and print various documents can be purchased and installed on the user's computer system. To assist and instruct the user regarding the use and features of the product, a printed user manual or electronic help files may be provided. Some telephone advice of a limited and general nature about the use of the product may be available from the product vendor. With this type of product, the user is typically constrained to printing the user's document on the user's local printing device. The printing devices commonly available in the home or in a small business are not capable of producing quantities of high-quality, full-color materials.

Most personal computers are configured to be capable of accessing information over the World Wide Web. Commercial enterprises have recognized the huge potential of the Web for promoting and selling products and services, and many Web sites have been developed for these purposes. In addition to offering a wide range of information about their products and services, many sites provide tools that allow a user to search the site offerings, select a specific product or service, place an order, and arrange for payment. Enterprises engaged in supplying printed products and printing services are no exception and Web-based printing services sites are widely used. For example, the VistaPrint.com site allows a user to access the site and use downloadable user tools and templates supplied by VistaPrint to select, design, and purchase personalized products for business use, such as business cards, postcards, brochures, and letterhead, and for personal use, such as invitations, announcements, and thank you cards.

Web sites can be accessed by the user from any personal computer or other device running a suitable browser program, such as Internet Explorer from Microsoft Corporation. A printing services site typically provides online help files and may provide some telephone, email or "chat" advice about how to use the service. After the user has completed, reviewed and approved the design of the custom product, the user can place an order for the desired quantity of copies to be printed on high-quality printing systems and delivered to the user's home or business. Some sites allow a personalized document to be printed on a printing device local to the user.

Despite the popularity of the Web and the availability of powerful and user-friendly Web-based user tools, a great many people continue to ob materials though other channels. Some of these people may not have access to the Web while others simply may not be comfortable with their personal ability to use a Web system properly. These prospective customers typically obtain their materials by traveling to a local print shop or a office supply chain store, describing their requirements to a clerk, reviewing representative samples of similar products, and placing an order for production of the desired quantity of product.

Unattended computer-implemented stations allowing a user to access information or obtain goods or services are in common use and familiar to most people. These stations typically take the form of a kiosk, booth, or wall installation. The station generally contains a local microprocessor-based system, a display device, and one or more means of allowing the user to enter commands or information, such as a keyboard, keypad, or touch screen. Developers of these types of stations often use standard personal computer hardware, software and operating systems. Modern stations are frequently connected to a remote server system by means of a network, and some stations are equipped with a telephone handset allowing the user of the station to contact and speak with a representative of the business associated with the station for the purpose of asking general questions or reporting problems or malfunctions.

Special purpose kiosk-type stations allowing a user to personalize a greeting card, business card, or other documents are known in the art. These systems typically incorporate a local printing device so that the user can immediately receive the personalized product. User assistance is often limited to on-screen or printed instructions displayed at or near the kiosk. For kiosks located in retail establishments, some assistance may also be available from establishment employees.

It would be desirable to provide a search, design, and ordering system where customers interested in obtaining customized products or services could access electronic search, selection, and user tools, perform actions, and place an order while simultaneously having access to the advice and assistance of a skilled product expert.

SUMMARY OF THE INVENTION

The present invention is directed to satisfying the need for systems and methods that provide a user with the ability to design, review, approve, and place an order for custom products or services while simultaneously receiving advice and assistance from an customer service representative at a remotely located support system. In accordance with the invention, a user needing assistance is connected to a remotely located support system. A display and control communication connection is established such that the customer service representative operating the remote support system can observe the status of the user system, monitor the actions of the user, and, if appropriate, perform operations for the user. A discussion communication connection is also established such that the operator of the support station can receive inquiries from the user and the user can receive responses and advice from the operator.

It is an advantage of the invention that a user can obtain expert answers, advice, and assistance during the product design process.

It is another advantage of the invention that both control and discussion communication connections can be established and simultaneously maintained between a user and a support system operator.

These and other objects, features and advantages of the invention will be better understood with reference to the accompanying drawings, description, and claims.

DESCRIPTION OF THE EMBODIMENT

Figure 1:
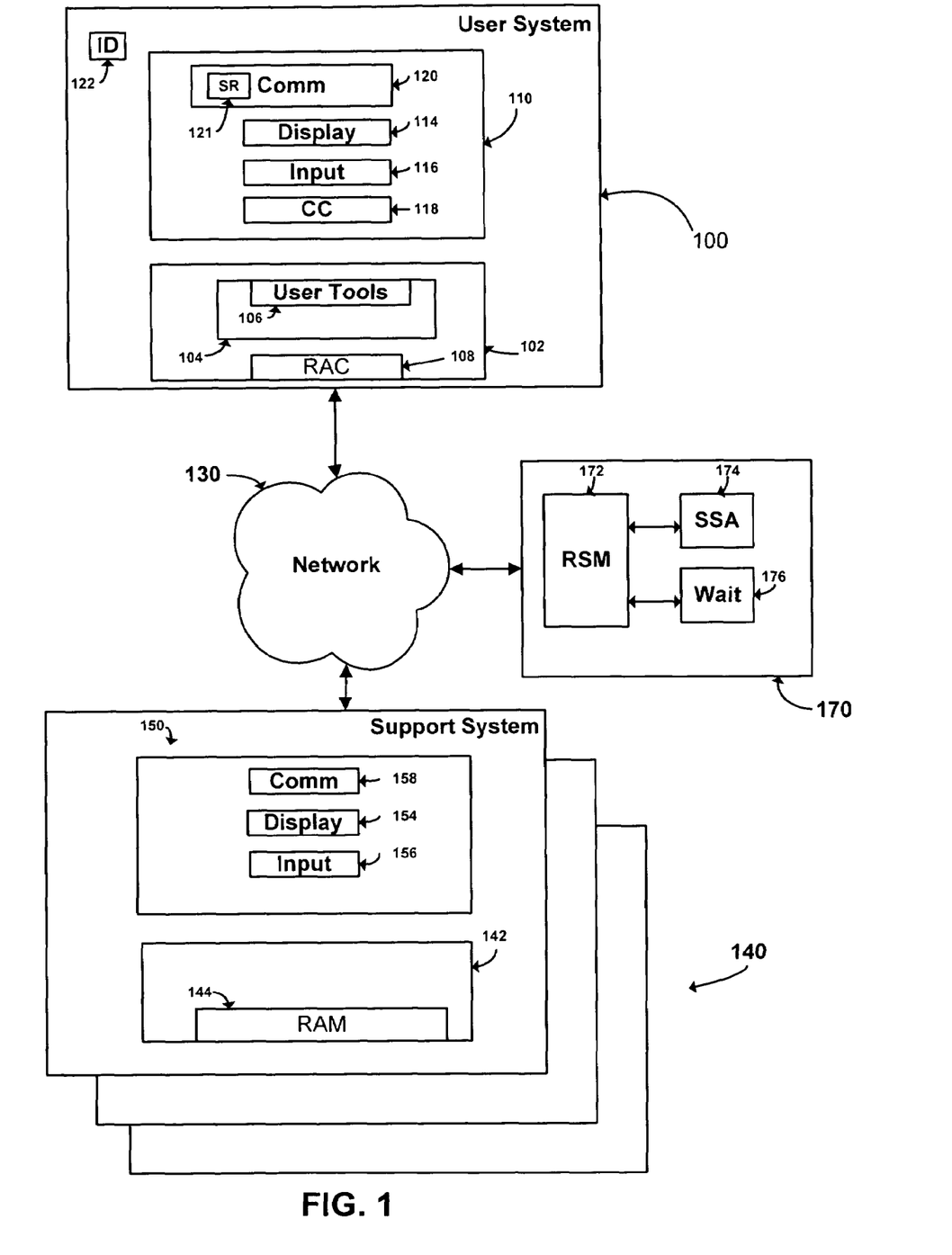
FIG. 1 is a representation of an embodiment of the invention.

Referring to FIG. 1, a schematic representation of an embodiment of a remote assistance "retail" system according to the present invention is depicted. The retail system could be implemented in various physical configurations, such as a freestanding kiosk, an embedded wall installation, or an enclosed booth. Retail system 100 is a representative retail system connected to a network 130, such as the World Wide Web. In a preferred embodiment, a plurality of such retail systems would all be similarly connected to network 130 and positioned at numerous geographically dispersed locations, such as stores, shopping malls, and airports. Retail system 100 in the discussed embodiment is adapted to allow a person using the system to select and design a custom product for subsequent printing. The printing equipment, not shown, could be in the vicinity of the user system or could be located remote from the user system.

User interface 110 represents the various system 100 components that interface directly with the user of the system. Display 114 is a CRT, LCD, or other device suitable for displaying product information and designs to the user. Input 116 represents collectively all devices capable of receiving data or commands from the user to control the product customization process. In the retail embodiment of FIG. 1, input 116 includes a keyboard, track ball, and touch screen display. More, different, or fewer input devices could be employed. In the disclosed embodiment, credit card reader and printer system CC 118 is provided to allow the user to pay for the user's purchase and receive a receipt at the user system. A credit card reader device is not required. The system could allow the user to arrange for payment in another fashion, such as entering the credit card number using a keyboard or other character input device, speaking the credit card number to a remote support system operator, sending in payment by check through the mail, or, if the user system is located in or near a retail establishment with which the user system provider has an appropriate arrangement, paying in the retail establishment.

Comm 120 represents collectively the systems allowing the user of system 100 to be placed into contact with a live customer support representative of the provider of system 100. Comm 120 could be implemented, for example, as a telephone handset connected through the user system to a dedicated telephone system. When the user activates the system, such as by lifting the handset, the phone system connects the user to the internal support representative phone call routing system of the retail system 100 provider. If a hands free environment for the user is desired, comm 120 could alternatively be implemented as a speakerphone type installation using a microphone and one or more speakers. As another alternative embodiment, comm 120 could be implemented using voice-over-IP or other audio transmission technology such that the voice conversation with the remote service representative is conducted through network 130. As yet another implementation, comm 120 could be implemented using text and/or video instant messaging or chat technology to exchange questions and comments over network 130 between the user and the support representative. For users who may prefer to use their own telephone equipment, or as a backup measure in the event of technical difficulties that prevent the use of the primary comm 120 system, a toll-free telephone number can be displayed on or adjacent to system 100 such that the user may establish voice contact with a support representative of the service provider to request initiation of a support session.

System 100 is controlled by a local computer unit 102, such as the microprocessor-based systems used in modern personal computers, capable of communicating over network 130. Computer 102 would typically, but would not have to, be located in the same area, cabinet, or physical enclosure as user interface components 110. In the disclosed embodiment, network 130 is the Web and computer 102 is running a suitable Web browser program 104, such as Internet Explorer from Microsoft Corporation. Running in browser program 104 are user tools 106. User tools 106 includes the various tools allowing the user to perform the actions that the user may wish to perform on system 100, such as searching the various product offerings, creating a desired custom product design from a plurality of pre-designed product templates provided by the provider of system 100, and placing an order for production of the custom product. Software tools designed to execute in the browser of a personal computer, such as the downloadable tools available from VistaPrint.com, are known in the art.

Computer 102 is also configured with the remote administration client program (RAC) 108 of a remote administration program, such as Radmin from Famatech LLC. As is known in the art, remote administration programs allow a computer system in one location to be accessed and controlled remotely over a network by another computer system in a different location.

A number of remote support systems 140 operated by customer support representatives are connected to network 130. Each remote support system contains a processor 142, such as a typical personal computer processor, running the remote administration master (RAM) program 144. Each remote support system 140 further has a display device 154, one or more typical input devices 156, such as a keyboard and a mouse, and a communication system comm 158 that is compatible with comm 120.

In the disclosed embodiment, each retail system 100 operates as an access point for the user into the service provider's Web site that is also available to home and office users. It is not a requirement that retail systems 100 be compatible with or connected to the same Web site provided by the printing service provider for home and office users, but as discussed below, it is advantageous to do so. Site 170 represents the Web presence of the printing services business that supports and maintains user systems 100. While shown as a single block, it will be understood that site 170 would typically comprises multiple server systems, data storage devices, and communication systems operating cooperatively.

Figure 2:
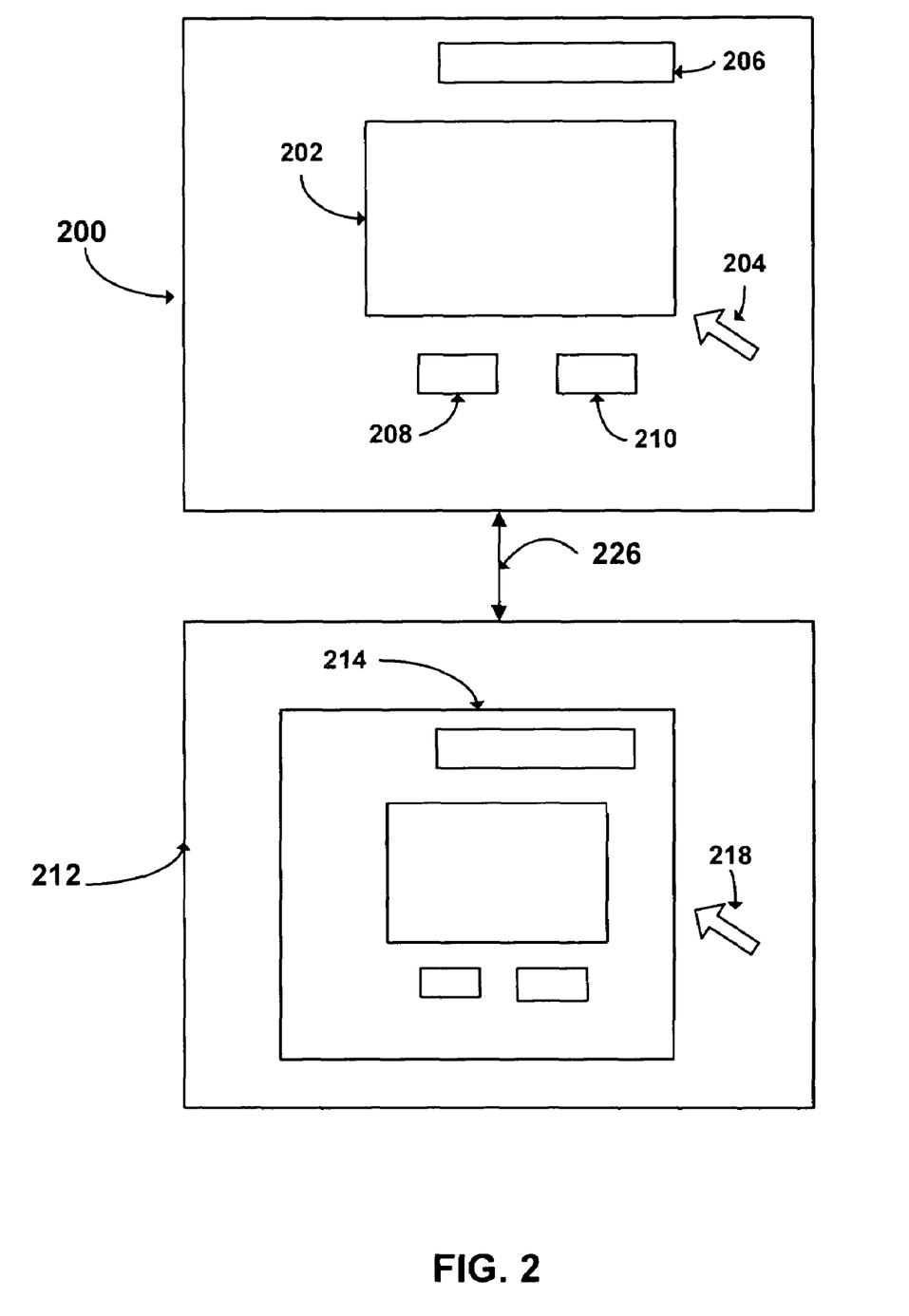
FIG. 2 is a representation of a user display and a corresponding support display according to one embodiment of the invention.

Referring to FIG. 2, a representative retail system display 200 and related support system display 212 for the embodiment of FIG. 1 are depicted. Display 200 represents an exemplary display being viewed by a user of a retail system 100 during the design of a personalized product. A retail system 100 may employ one or more special screen displays for the purpose of attracting and instructing potential customers, but a user of retail system 100 will see substantially the same product design screens and have substantially the same product design and ordering experience as a customer would if accessing site 170 using a home or office computer. Maintaining substantial similarity between the retail experience and the home or office experiences allows the retail system to function not only as a purchase point but also as a training tool to familiarize the customer with the range of products and available tools and services offered by the service provider. Customers who may have initially been hesitant to use the service provider's Web site can gain confidence and skill and will be more likely in the future to design additional products directly on the Web site through a home or office computer. Similarly, Web site customers who have previously performed a product design using a home or office computer can, if they so choose, quickly and easily design a product on a retail system using familiar displays and tools.

In the situation shown in FIG. 2, the user of retail system 100 is designing a product 202, which could be a business card, postcard, brochure, invitation, return address label, or other product that the user desires to be subsequently printed. The invention is not limited to paper documents, but could be readily applied to any type of custom design situation, such as items of clothing or promotional goods. Also shown are cursor 204, tool bar 206 providing controls and menus for entering and editing content in the product being designed, and navigation buttons 208 and 210 allowing the user to move ahead or back to a subsequent or preceding display screen. The design and operation of these types of elements is well known. Display 200 would typically also include various other content, not shown, such as user instructions, promotional messages, or links to other pages.

Display 212 represents the display viewed on display 154 by the operator of the support systems 140 that has been assigned to provide assistance to the user of retail system 100. Data and commands are transferred between the user system and the support system by means of messages passed between the systems through network 130. This is shown more directly in FIG. 2 as display and control communication connection 226. As mentioned above, during all or most of the time that the display and control connection is present, there will also be a discussion communication connection, such as a voice or text messaging connection, between the user of the user system and the operator of the support system assigned to assist that user.

A representation of the information displayed on the user's screen is substantially simultaneously displayed in a window 214 on the operator's screen. The relative size of window 214 can be chosen based on the size and resolution of the operator's display 154, the operator's viewing preferences, the number of retail systems being monitored by the operator, or other factors. Remote administration programs RAC 108 and RAM 144 cooperate to repetitively capture the current user system display image multiple times per second and forward the image information to the support system for displaying in window 214. The operator of the support system can therefore observe any information entered or changes made by the user and provide substantially real-time feedback and advice. While display 212 is shown with a single window 214, a skilled operator with a suitable display 212 could be simultaneously viewing multiple different windows 214 and interacting with multiple different user systems.

Remote administration master and client programs RAM 144 and RAC 108 function in a manner that allows the operator of the support system to take over active control of the user system. If a user is confused or uncertain about what action is appropriate or how an action is to be performed, the operator can take control of the user system and perform the action from the support system 140 by moving the operator's cursor 218 into window 214 and performing the desired action. The commands entered by the operator are transmitted to the user system over network 130 where processor 102 executes the commands and updates display 200 appropriately. The display 200 image is, as mentioned, repetitively captured and sent back to the support system so that the operator can observe the changes on the user system.

Figure 3:
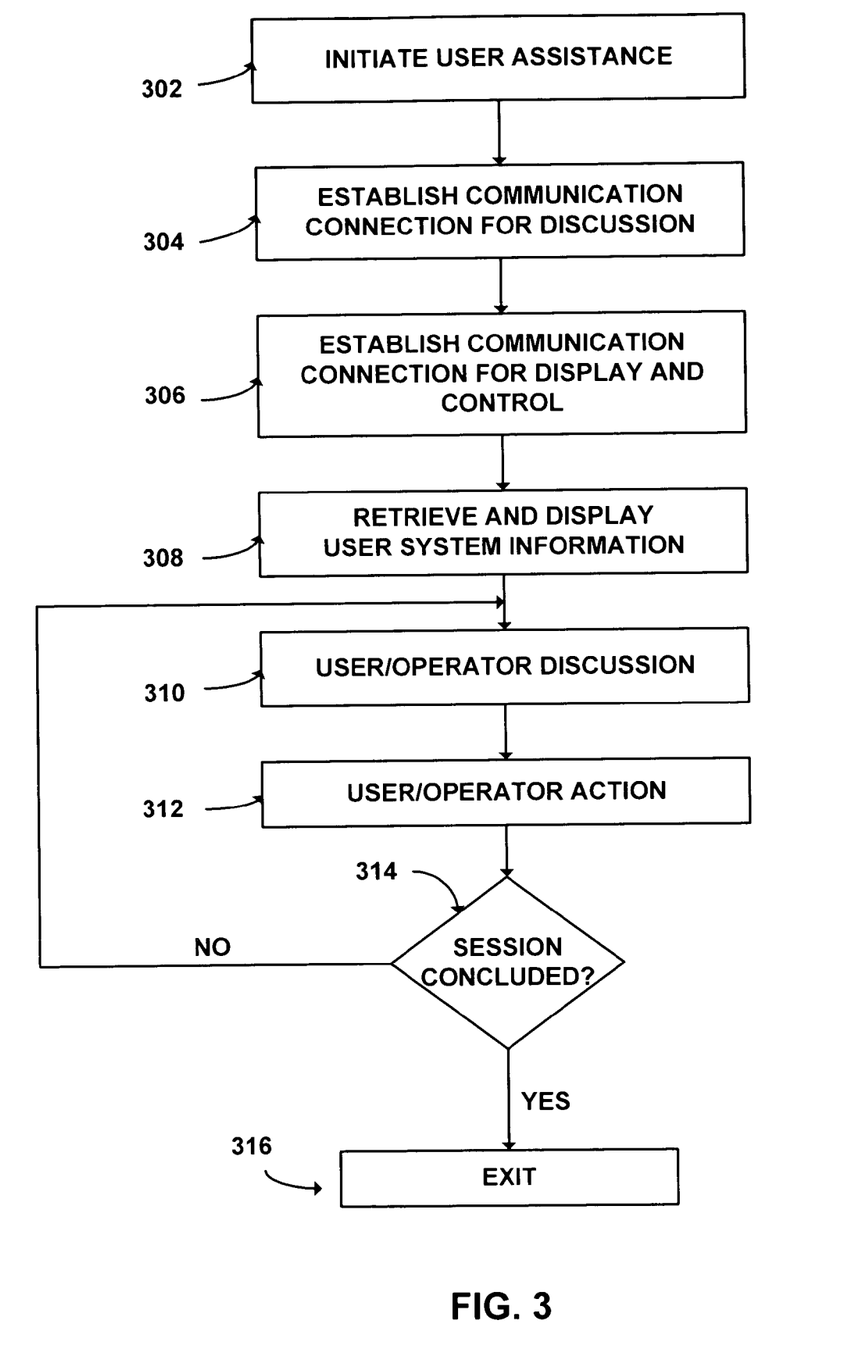
FIG. 3 is an exemplary flow chart of a process according to the invention.

Referring now to FIG. 3, the overall flow of representative embodiments of the remote support process will now be discussed. The user support process may be initiated either by the user of retail system 100, by the retail system 100 based on user actions, or by a support system 140. Looking first at user-initiated requests, at step 302 the user of system 100 can indicate a desire for remote assistance by, for example, lifting the telephone handset positioned in proximity to display 114 and input 116.

At step 304, the lifting of the handset initiates the connection of the user through commercial switching systems with the service provider's automated internal telephone call center system. The user is connected with a support system operator who is available at that time to work with the user. If no operator is immediately available, the user will enter a phone system wait queue and be provided with one or more appropriate prerecorded messages. The discussion connection is established when a support system operator is successfully connected with the user.

In addition to the discussion connection between the user and the operator, at step 306 a data and control connection is established between retail system 100 and the operator's support system 140. This requires determining the network address of the retail system 100. If the comm 120 system is capable of uniquely identifying the user system associated with each comm 120 communication line, the network address can be automatically determined. For situations where comm 120 is not capable of reliably and uniquely identifying the user system, each system 100 can have a label with identifying indicia ID 122, such as a relatively simple number or name, affixed to the system structure and visible to users. After the discussion connection has been established, the operator can request the user to read the contents of ID 122 to the operator, allowing the operator to determine the network address from a master user system address list available to the support system. Having the retail system 100 network address allows the operator at step 308 to remotely activate the administration program 108 at the appropriate user system and open a window, such as window 214, at the operator's support system displaying the current user system display to the operator.

As an alternative method of user support request, user interface 110 could include a means for allowing the user to simultaneously generate a request for remote assistance and identify the user's particular user system. For example, comm 120 could include support request system SR 121. SR 121 could be implemented as a physical pushbutton or other manually operable device bearing an instructive legend such as "Request Remote System Support" or could be implemented as a similarly labeled area on the touch screen display that is visible to the user. Alternatively, SR 121 could be implemented as an instructive label on or adjacent to display 114 instructing the user to enter a specific set of keystrokes to initiate a remote support request. When activation of SR 121 is detected by processor 102, processor 102 is programmed to send a support request message to remote support master program RSM 172 running on the service provider's web site 170. The message is structured to contain the network address of the user system generating the message.

RSM 172 monitors for SR 121 triggered messages from user systems 100 and also for availability messages from support systems 140. Each support system 140 sends an availability status message to RSM 172 each time it concludes a user support session and is again free to handle a different user support request. If one or more support systems 140 are currently free, RSM 172 maintains a support system availability list SSA 174, containing the identifiers of all support systems 140 currently available to respond to a new user support request. If SSA 174 contains one or more entries when RSM 172 receives a support request message from retail system 100, RSM 172 selects an available support system from SSA 174 and generates an assignment message to the identified remote support system 140 containing the network address of the user system to be supported. If no support system 140 is immediately available when RSM 172 receives a support request message, RSM 172 adds the request message to wait queue 176 containing pending support request messages. If wait queue 176 contains one or more pending requests when an availability status message is received from a support system 140, RSM 172 will respond by retrieved a waiting support request from wait queue 176 and transmitting an assignment message to the support system.

When the selected support system 140 receives the assignment message from RSM 172, it extracts the user system network address and establishes the display and control connection with the user system using remote administration programs 144 and 108. The support system can then notify the user that support is active by opening a discussion connection such as by using text and/or video messaging, voice-over-IP or, if supported by the user and support systems, initiating a connection by telephone.

Alternatively, support sessions can also be initiated without specific user request or action. User tools 106 monitors for certain predetermined situations considered by the service provider as indicating a likelihood that the user will benefit from assistance, such as design sessions involving larger or more complex products, users demonstrating excessive or repetitive hesitation, or users making incomplete or incorrect inputs. In response to detecting these conditions, user tools 106 can either prompt the use to request support by displaying a message such as "Would you like assistance from a support representative?" or proactively cause a support session to be initiated by automatically generating a support request message to RSM 172.

As yet another alternative method of initiating support, operators of support systems 140 who are not otherwise fully occupied in supporting other users, can be monitoring active retail system 100 design sessions to identify users who appear to be having difficulty or who might benefit from some assistance with a complex or large design project. For such users, the operator could proactively contact the user and offer assistance or advice.

Support sessions will not all begin at the same place or under the same conditions. Some users may not know how to begin the product design process and may initiate the connection with a support system prior to having made any product design decisions while other users may have made substantial progress or even completed the design entirely before requesting assistance. At step 310, the user and the operator can discuss the user's requirements, questions, or concerns and decide on the next action to be taken. At step 312, either the user or the operator can make a selection, enter or modify text, or take an other appropriate action as was discussed or agreed between the user and the operator at step 310.

Typically, once having been connected to a user, the operator will maintain the connection with and continue to assist the user, either indirectly by giving instructions or advice so the user can perform an operation or directly by taking control of the user system and performing actions while the user observes on the user system display, until the user has completed the product design session. During this period the operator may, as mentioned above, also be engaged in monitoring and assistance of one or more other retail system users.

At step 314, if the design and purchase process is not completed, steps 310 and 312 will be repeated as many times as necessary until the session is concluded. At step 314, when the session is concluded, the connections between the user system and the support system will be terminated. A session can be concluded either by the user's actions, such as indicating a desire to end the session prior to completing the purchase of the product, or when all final post-design steps have been completed, such as providing delivery address information and arranging payment. If the user has placed an order for production of the product, the electronic description of the user's product design is transferred from retail system 100 over network 130 to the service provider's Web site 170 for storage and subsequent production of the desired quantity of the printed product. Printing of the product could occur remotely with the finished product being delivered to the user by mail or another third party delivery system or, if suitable printing systems are available near the retail system, printing could be arranged such that the user can obtain the printed products directly.

Figure 4:
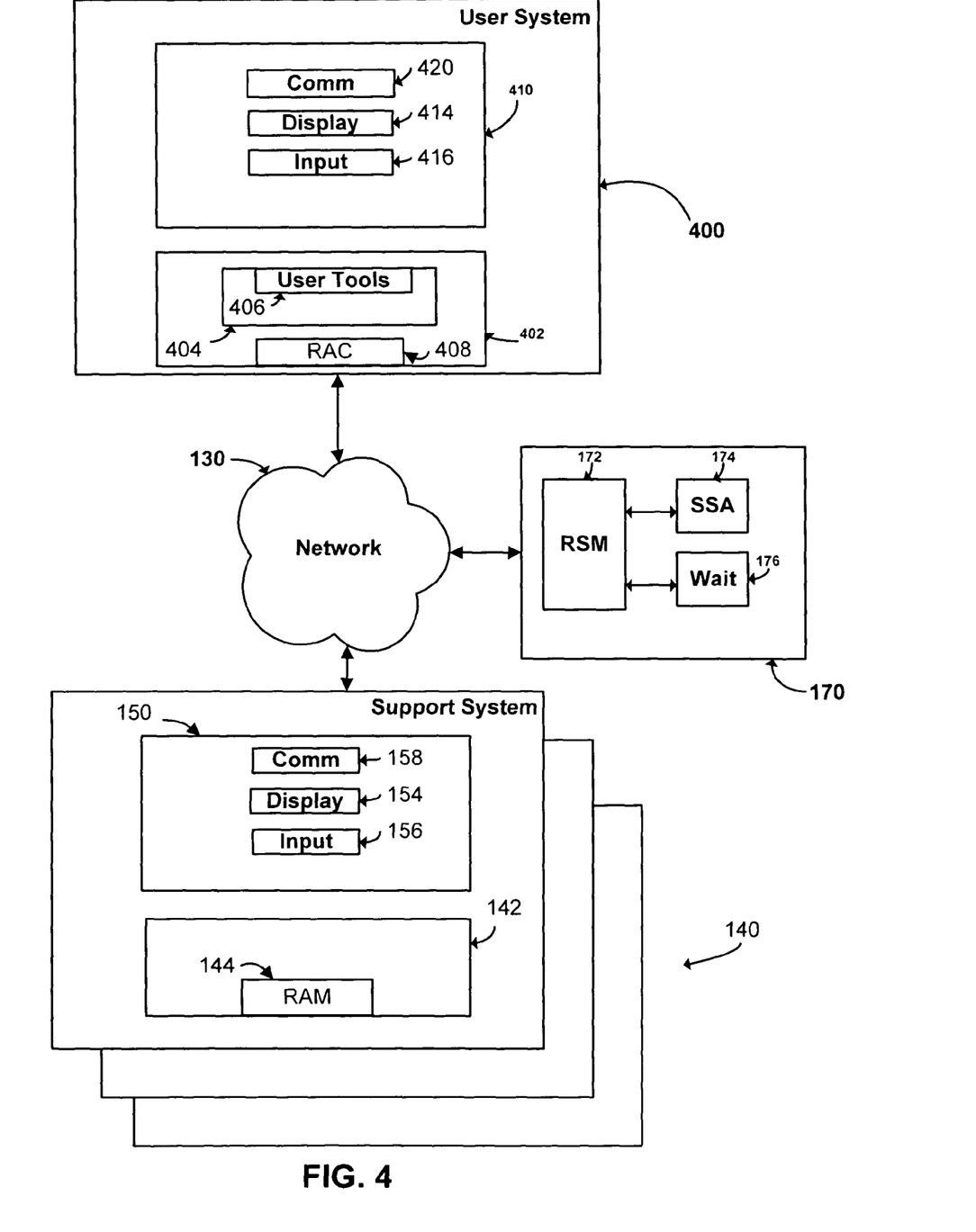
FIG. 4 is a representation of another embodiment of the invention.

The invention is not limited to use only in a kiosk or other retail application. The invention can also be applied in a more generalized Web environment involving users accessing the service provider's Web site from a home or office computer. Referring to FIG. 4, an alternate embodiment is depicted. User system 400 is a typical home or office personal computer or other device having a processor and capable of running a browser program such as Internet Explorer and having a CRT, LCD, or other display device 414 and input devices 416, such as a mouse and a keyboard. User processor 402 is running browser program 404. Running in browser 404 are user tools 506. User tools are downloaded to a user system automatically from site 170. All user tools can be downloaded at one time or, alternatively, one or more individual user tools for supporting specific user activities can be downloaded to the user system on an as-needed basis.

Comm 420 represents all available discussion communication channels, such as voice-over-IP, text and/or video messaging or chat, or the user's personal or work telephone system. While a user's home or work computer system would not have a dedicated support request tool similar to SR 121, a similar service request function would be provided by means of information displayed to the user by user tools 406 during the design process, such as a dynamic link displayed on display 200 that, when clicked by the user, generates a support request message through network 130 to the service provider's Web site 170.

To determine whether remote administration client program RAC 408 is already available in user system 400 when the design session begins, the assigned support system 140 will attempt to establish a control communication connection with the user system when a user of user system 400 requests support. If RAC 408 is not present on user system 400, the support system 140 will notify site 170, which will offer to download RAC 408 to user system 400 from site 170 or another computer system controlled by site 170. Other alternate techniques of providing RAC 408 to a user could also be employed, if desired. Support system 140 could have a copy of RAC 408 and be configured to offer to download RAC 408 directly to user system 400 or the service supplier could arrange for RAC 408 to be delivered to a user on a CD or other removable media. RAC 408 could then be installed by the user of user system 400 using a typical installation wizard. Once RAC 408 is installed and running in processor 402 of user system 400, the support system 140 can establish a display and control connection and initiate active support.

Figure 5:
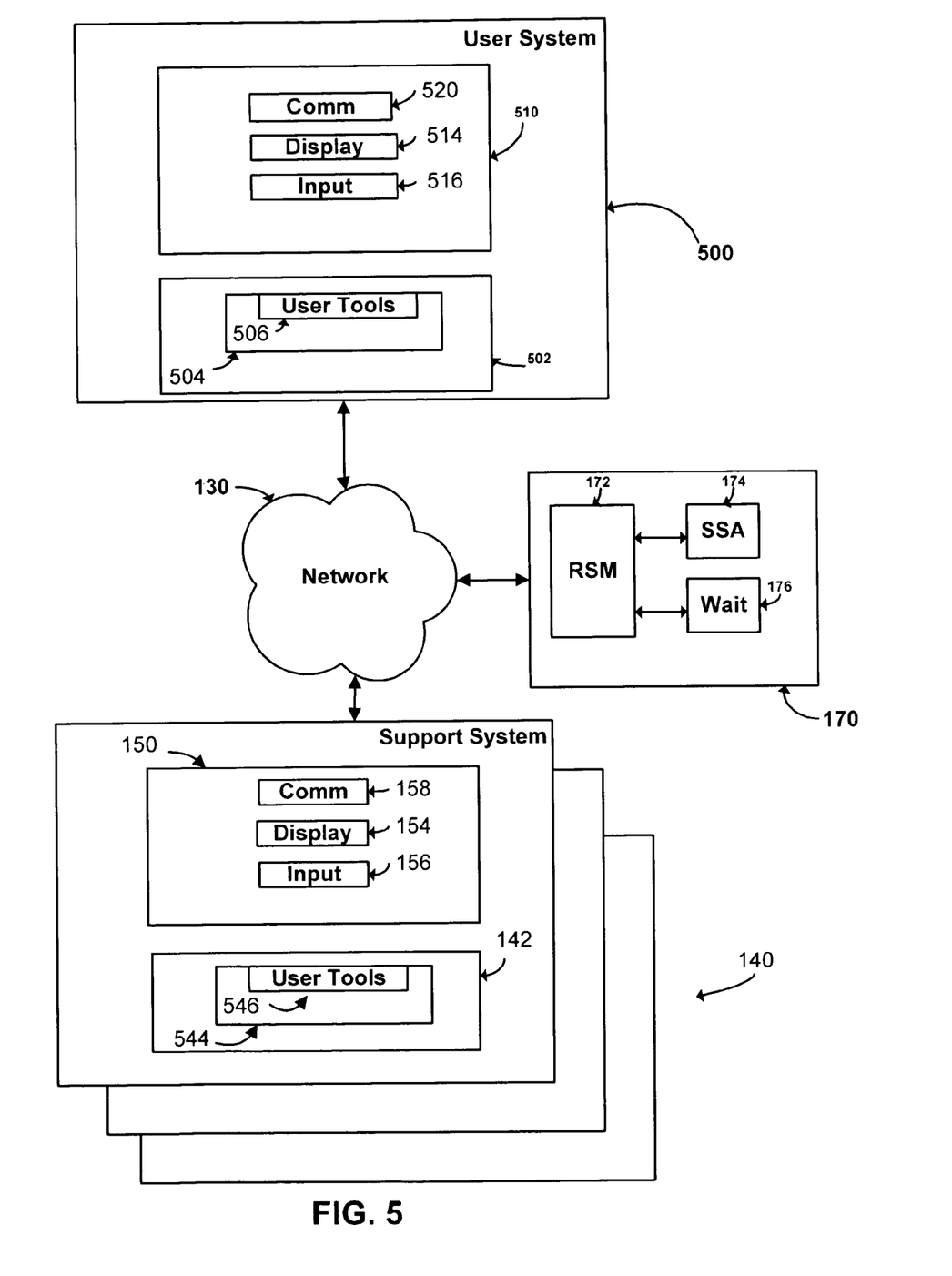
FIG. 5 is a representation of yet another embodiment of the invention.

FIG. 5 depicts an embodiment of the invention taking advantage of the capabilities of downloadable programs executing in the user's browser. User system 500 is again a typical home or office computer system, but could also be a retail system. User processor 502 is running browser program 504. Running in browser 504 is user tools 506. As mentioned above, user tools can be downloaded at one time or, alternatively, one or more individual user tools for supporting specific user activities can be downloaded to the user system on an as needed basis. In this embodiment, support system 140 is running browser program 544.

Multiple browser programs are in general use by the public. There are variations between the browser products of different browser vendors, and typically there are variations between different versions of browsers from the same vendor. Therefore, while a single browser program 544 is shown in FIG. 5, each support system 140 will preferably be supplied with multiple different browser versions allowing the support system to be able to recreate the same browser environment as is running in multiple different user system 500 configurations.

A user of system 500 can request support, for example by clicking on a "Request Remote Support" link displayed to the user on some or all Web pages from site 170. Alternatively, user tools 506 can proactively initiate a support session based on the particular user situation and actions, as discussed above. A support request will be received by RSM 172 and processed as discussed above. When RSM 172 assigns a support system 140 to the user, the assigned support system 140 identifies the browser version in use on system 500 and activates a session with that specific browser version, ensuring that the support operator has the same display and experience as the user.

In the embodiment shown in FIG. 5, user tools 506 and user tools 546 operate cooperatively to repetitively exchange information input by the user of system 500 and by the operator of system 140 for the purpose of maintaining substantially synchronized displays at user system 500 and support system 140. User tools 506 frequently, preferably several times per second, transmits a message to support system 140 identifying the Web page currently being displayed on display 200 and any keystrokes or actions entered by the user of system 500 since the previous message. Similarly, user tools 546 repetitively transmits a message to user system 500 identifying the Web page currently being displayed in window 214 and any keystrokes or actions entered by the support operator of system 140 since the previous message. Alternatively, to reduce the volume of messages transferred between the systems, user tools 506 and 546 can be adapted to send messages only in the event of detection of a keystroke or other action by the local user or the operator.

User tools 506 and user tools 546 have access to the same Web pages from site 170; therefore, only a page identifier need be exchanged between the systems, not the entire page. When a new page is accessed by one system, the other system can obtain the new page directly from site 170. Each operation by either user will be quickly replicated at the other system, allowing either party to make a modification or enter a command locally and have the same modification or command transferred to and implemented at the other system. As described with other embodiments, a discussion connection using voice-over-IP, text and/or video messaging or chat, or the user's personal or work telephone system would also be established such that the user and operator can exchange questions and advice.

It will be understood that the use of client and master remote administration programs, as described in connection with the embodiment shown in FIG. 1, is not required in the retail environment. The use of user tools executing on both the user system and the support system, as described above in connection with FIG. 5, is applicable to and could be readily employed in the retail environment.

While the invention has been described in various exemplary embodiments, the described embodiments are to be considered as illustrative rather than restrictive. For example, the invention is not limited to product design applications, but could be applied to any situation where remote support and remote shared control of a user system by a support representative could be advantageously employed to assist a remote user, such as online purchasing of airline or other tickets, online completion of applications or other forms, and online catalog order shopping and order placement. The scope of the invention, therefore, is as indicated in the following claims and all equivalent methods and systems.

What is claimed is:

1. A remote assistance system comprising
    one or more user systems for allowing a customer of a remote printing services site to customize graphical content of a design of a product to be printed, each user system being operatively connected to a network and having a user processor running a browser program, one or more user tools executing in the browser program on the user processor and configured to allow a customer user of the user system to customize the design of a product at the user system and to communicate over the network with the remote printing services site, and a user display displaying the product design to the customer user of the user system,
    one or more remote support systems, each remote support system being operatively connected to the network and having a support processor, a support display, and one or more programs running on the support processor configured to allow an operator of the support system to view a user's product design substantially as the product design is being displayed to the user on the user display,
    means for establishing a communication connection between a user of a user system and an operator of a remote support system such that the user of the user system can submit product design inquiries to and receive responses from the operator of the remote support system while the product design is displayed to the user, and
    means for establishing a communication connection between the user system and the remote support system such that the support system can obtain the user's product design information from the user system over the network and display the product design to the operator while the operator is communicating with the user over the first communication connection.

2. The system of claim 1 wherein the one or more programs running on the support processor allow the operator of the support system to control the user system such that the operator can edit the product design at the user system while the product design is being displayed to the user.

3. The system of claim 1 further comprising
    means for requesting remote support for a user of a user system, and
    a server system operatively connected to the network, the server system having means, responsive to the request for remote support, for selecting an available one of the one or more remote support systems to provide remote support to the user and for supplying the request for support to the selected one of the one or more remote support systems.

4. The system of claim 3 wherein the server system further comprises a queue for holding requests for remote support if a support system is not available.

5. The system of claim 1 wherein the communication connection between the user of a user system and the operator of a remote support system is an audio connection.

6. The system of claim 5 wherein the audio connection is a telephone connection.

7. The system of claim 5 wherein the audio connection is a voice-over-IP connection.

8. The system of claim 1 wherein the communication connection between the user of a user system and the operator of a remote support system is a video connection.

9. The system of claim 1 wherein the communication connection between the user of a user system and the operator of a remote support system is a text messaging connection.

10. A networked user system for designing a product to be printed, the system comprising
- a processor running a browser program,
- one or more user tools executing in the browser program and configured to allow a customer user of a remote printing services site to customize graphical content of a design of a product at the user system and to communicate with a remote printing services site,
- a user display displaying the product design to the user,
- means for providing product design information to a remote support system to allow the remote support system to display the product design substantially as the product design is being displayed to the user on the user display, and
- means for allowing the user of the user system to submit product design inquiries to and receive responses from the operator of the remote support system while the operator is viewing the display information.

11. The system of claim 10 further comprising
- means for allowing the operator of the remote support system to edit the product design while the product design is being displayed to the user.

12. The system of claims 1 or 10 wherein the one or more user tools include at least one design tool for allowing a user of the user system to edit an electronic document.

13. The system of claims 1 or 10 wherein the one or more user tools execute in a browser program running on the processor.

14. A networked support system comprising
- at least one processor,
- at least one support display operatively connected to the at least one processor,
- means for enabling an operator of the support system to receive product design inquiries from and submit responses to a customer user of a remote user system designing a customized product to be printed, the remote system having a user display displaying the design of the product being customized,
- means for obtaining the user's product design information from the remote user system, and
- means for displaying substantially the same product design on the support display while the product design is being displayed to the customer user on the user display and while the operator of the support system is receiving inquiries from and submitting responses to the customer user.

15. The system of claim 14 further comprising means running on the processor for allowing the operator to edit the product design while the product design is being displayed on the user display.

16. The system of claims 10 or 14 wherein inquiries are submitted and responses are received by audio.

17. The system of claims 10 or 14 wherein inquiries are submitted and responses are received by text.

18. The systems of claims 10 or 14 wherein inquiries are submitted and responses are received by video.

19. A method of providing assistance from an operator of a support system having a support display to a customer user of a remote printing services site to customize graphical content of a design of a customized product to be printed, the user system having a processor running a browser program, one or more tools executing in the browser program and configured to allow the customer user of user system to customize the design of the product at the user system and to communicate with a remote printing services site, and a user display, the method comprising
- receiving a request for remote assistance from the user system, and
- in response to the request,
- establishing a communication connection between the user of the user system and the operator of the support system such that the user can submit product design inquiries to and receive responses from the operator,
- establishing a communication connection between the user system and the support system such that the support system can obtain the user's product design information from the user system, and
- displaying substantially the same product design on the support display as is being displayed on the user display while the user and the operator communicate over the communication connection between the user and the operator.

20. A method of providing assistance from an operator of a support system having a support display to a customer user of a remote printing services site to customize graphical content of a design of a customize products to be printed, the user system having a processor running a browser program, one or more tools executing in the browser program and configured to allow a user of the user system to customize the design of the product at the user system and to communicate with a remote printing services site, and a user display, the method comprising
- establishing one or more alert conditions corresponding to one or more predetermined product design actions by the user at the user system,
- using one or more of the tools executing in the browser program to monitor the remote user system for the occurrence of one or more of the alert conditions,
- in response to detection of one or more of the alert conditions,
- establishing a communication connection between the user of the user system and the operator of the support system such that the operator can communicate with the user to offer assistance,
- establishing a communication connection between the user system and the support system such that the support system can obtain the user's product design information from the user system, and
- displaying substantially the same product design on the support display as is being displayed on the user display while the user and the operator communicate over the communication connection between the user and the operator.

21. A method of providing assistance from an operator of a support system having a support display to a customer user of a remote printing services site to customize graphical content of a design of a customized product to be printed, the user system having a processor running a browser program, one or more tools executing in the browser program and configured to allow a user of the user system to customize the design of the product at the user system and to communicate with a remote printing services site, and a user display, the method comprising establishing one or more alert conditions corresponding to one or more predetermined product design actions by the user at the user system, using one or more of the tools executing in the browser program to monitor the remote user system for the occurrence of one or more of the alert conditions, in response to detection of one or more of the alert conditions, using one or more tools executing in the browser program to generate a message at the user system to the user of the user system inquiring if the user would like assistance from the support system, if the user indicates that the user would like assistance, establishing a communication connection between the user of the user system and the operator of the support system such that the operator can communicate with the user to offer assistance, establishing a communication connection between the user system and the support system such that the support system can obtain the user's product design information from the user system, and displaying substantially the same the information product design on the support display as is being displayed on the user display while the user and the operator communicate over the communication connection between the user and the operator.

22. The method of claims 19, 20 or 21 further comprising the operator editing the product design at the user system while the product design is being displayed to the user.

23. The method of claims 19, 20 or 21 wherein the communication connection between the user of a user system and the operator of a remote support system is an audio connection.

24. The method of claims 19, 20 or 21 wherein the audio connection is a telephone connection.

25. The method of claims 19, 20, or 21 wherein the audio connection is a voice-over-1P connection.

26. The method of claims 19, 20 or 21 wherein the communication connection between the user of a user system and the operator of a remote support system is a video connection.

27. The method of claims 19, 20 or 21 wherein the communication connection between the user of a user system and the operator of a remote support system is a text messaging connection.

* * * * *